Aug. 13, 1963     E. JONES     3,100,691
LIQUID INDICATOR WITH MOISTURE INDICATION MEANS
Filed March 12, 1959     3 Sheets-Sheet 1
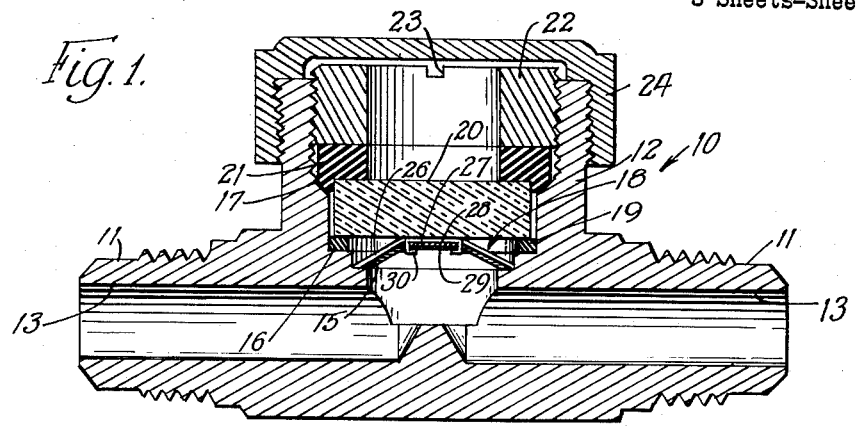
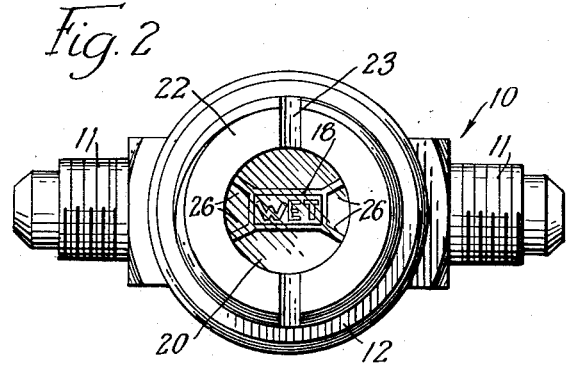
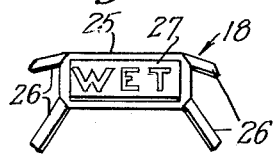
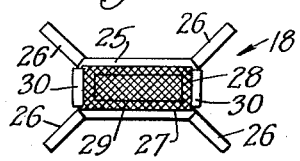
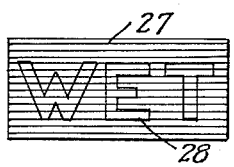
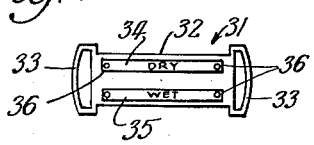
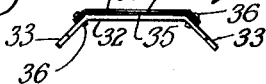
INVENTOR.
Evan Jones,
BY
Cromwell, Greist & Warden
attys.

Aug. 13, 1963 E. JONES 3,100,691
LIQUID INDICATOR WITH MOISTURE INDICATION MEANS
Filed March 12, 1959 3 Sheets-Sheet 2
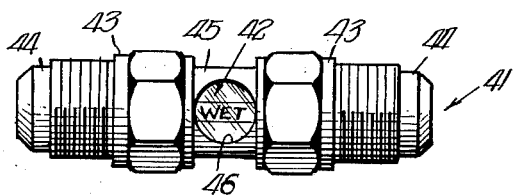
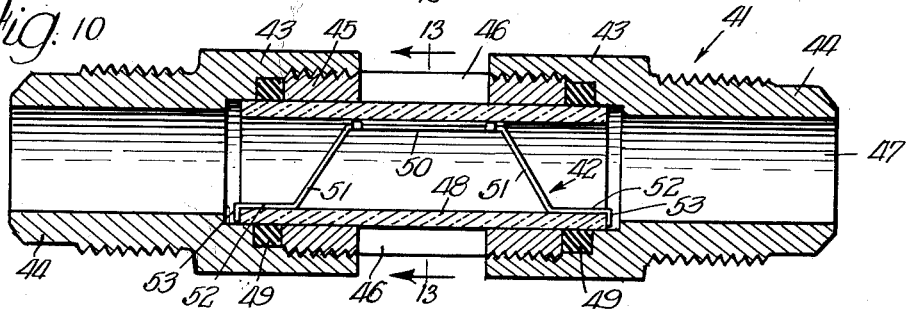
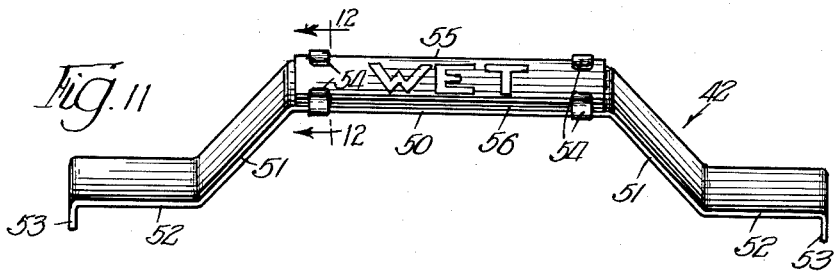
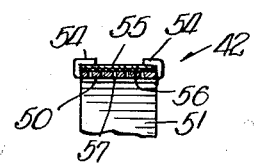
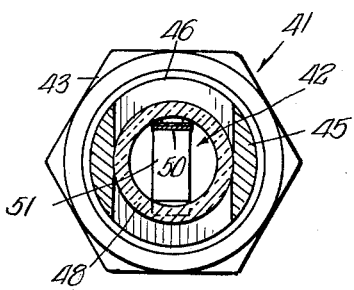
INVENTOR.
Evan Jones,
BY
Cromwell, Greist & Warden
Attys

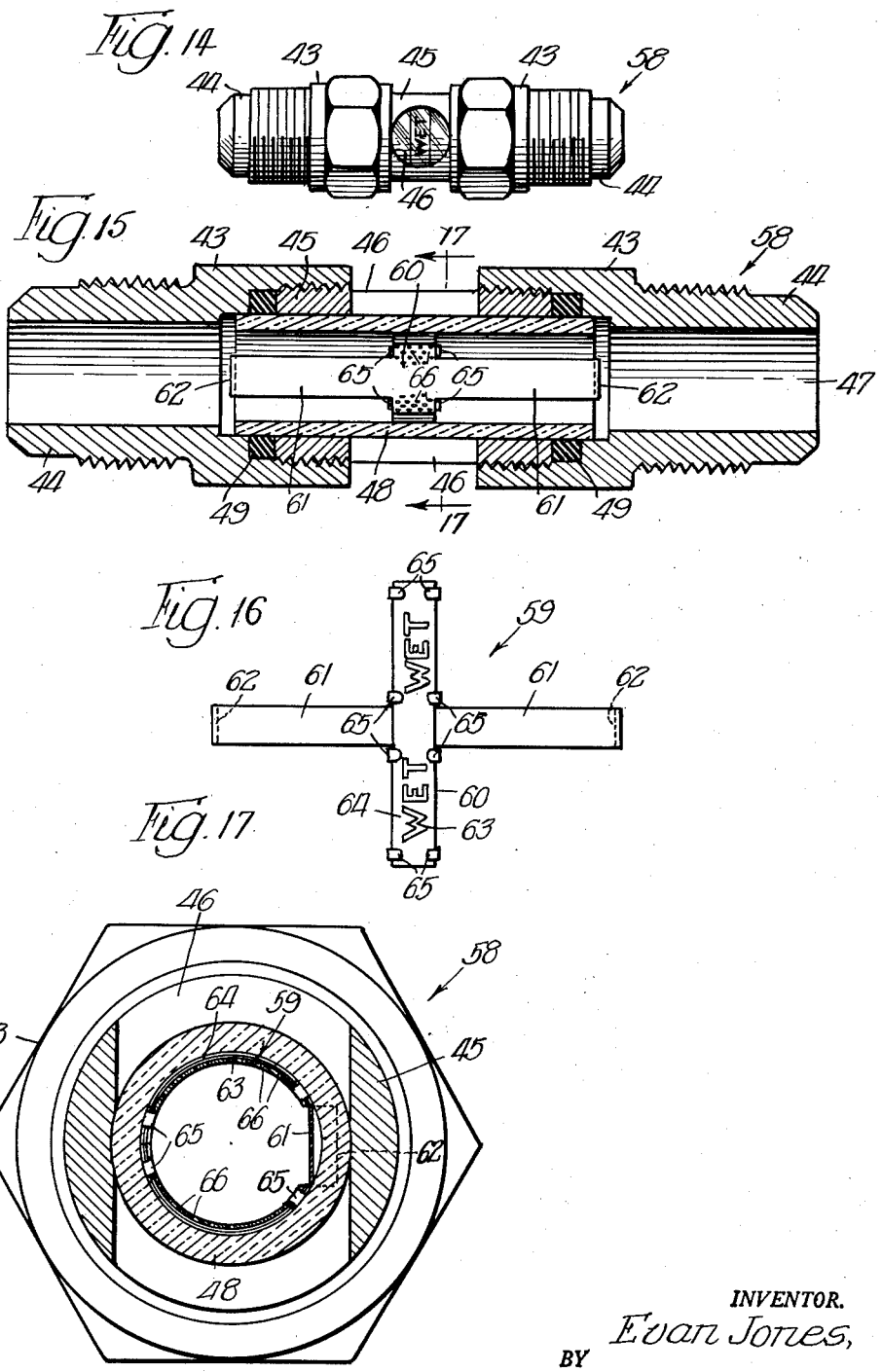

United States Patent Office 3,100,691
Patented Aug. 13, 1963

3,100,691
LIQUID INDICATOR WITH MOISTURE
INDICATION MEANS
Evan Jones, Evanston, Ill., assignor to Henry Valve Company, Melrose Park, Ill., a corporation of Illinois
Filed Mar. 12, 1959, Ser. No. 798,981
7 Claims. (Cl. 23—253)

The present invention deals with means providing for the observable indication of predetermined moisture content in liquid refrigerant. More specifically, the invention is directed to new and improved forms of liquid refrigerant indicators and refrigerant moisture content indication means therefor, which means in installational use in the indicators provides for readily observable, accurate evaluation of refrigerant moisture content.

Different moisture indicating means have been designed and tested as to suitability for use in refrigeration systems. The types of moisture indication means utilized commercially have varied considerably for several different reasons. By way of example, it has been found that certain types of indication means require interpretation by skilled personnel thus materially limiting the overall usefulness of the same. In many instances, the operation of a refrigerating system is observed by a person who is relatively unskilled and serious damage to the system can occur as a result of excessive moisture accumulation before the operator is aware of such accumulation.

Color changes in moisture sensitive paper maintained in contact with liquid refrigerant have been relied upon as an observable indication means. In certain instances the degree of color variation is not readily noticeable to the untrained eye and excessive moisture accumulation is often not adequately recognized. Furthermore, in an effort to provide a contrasting color system whereby the operator is provided with a standard color for comparison with the changing color of the moisture sensitive material in contact with the refrigerant, the color reference material if not forming a part of the actual refrigeration equipment becomes easily misplaced and, even if forming a fixed part of the refrigeration equipment often becomes soiled or otherwise damaged.

It is an object of the present invention to provide new and improved moisture indication means for use in liquid refrigerant indicators.

A further object is to provide new and improved refrigerant moisture indication means incorporating therein as a part thereof readily apparent and observable comparative colors for moisture content indicating purposes.

Another object is to provide new and improved refrigerant moisture indication means in the form of moisture sensitive material retainers which are easily and readily mounted in standard types of liquid refrigerant indicators, the retainers being provided with a layer of moisture sensitive material capable of changing color in response to variation in moisture content, and a moisture insensitive material combined with the moisture sensitive material to provide a "covering" and "background" arrangement with the overlaying material having formed therein in stencil-like manner a word instruction which is observable based on the moisture content of liquid refrigerant in contact with the moisture sensitive material, the observable instruction being readily highlighted by contrasting colors of the different materials.

Still a further object of the present invention is to provide new and improved liquid refrigerant indicators having as a part thereof readily observable, color contrast and color variable refrigerant moisture indication means.

Other objects not specifically set forth will become apparent from the following detailed description made in conjunction with the drawings wherein:

FIG. 1 is a longitudinal section of one form of liquid indicator having mounted therein a moisture indication means of the present invention;
FIG. 2 is a top plan view of the indicator of FIG. 1;
FIG. 3 is an enlarged perspective of the moisture indication means as viewed from the top thereof;
FIG. 4 is a bottom plan view of the indication means;
FIGS. 5 and 6 are illustrations of color changes occurring during use of the moisture indication means;
FIG. 7 is a top plan view of a modified form of moisture indication means particularly adapted for use in the indicator of FIGS. 1 and 2;
FIG. 8 is an elevation of the indication means of FIG. 7 with the same prepared for mounting in the indicator;
FIG. 9 illustrates a tubular type liquid indicator carrying therein a modified form of moisture indication means of the present invention;
FIG. 10 is an enlarged longitudinal section of the liquid indication of FIG. 9;
FIG. 11 is an enlarged perspective of the modified form of moisture indication means mounted in the liquid indicator of FIGS. 9 and 10.
FIG. 12 is a fragmentary section of the indication means of FIG. 11 taken generally along line 12—12 therein;
FIG. 13 is a transverse section of the indicator of FIG. 10 taken generally along line 13—13 therein;
FIG. 14 illustrates the tubular liquid indicator of FIG. 9 having mounted therein still a further modified form of moisture indication means;
FIG. 15 is an enlarged longitudinal section of the indicator of FIG. 14;
FIG. 16 is a plan view of the modified moisture indication means; and
FIG. 17 is an enlarged transverse section of the indicator of FIG. 15 taken generally along line 17—17 therein.

FIGS. 1 and 2 illustrate a "bull's-eye" liquid refrigerant indicator 10 including a one-piece body formed from metallic material such as forged brass. The body is provided at opposite ends thereof with externally threaded nipple portions 11 and centrally thereof with an upstanding annular collar 12. The nipple portions 11 are each provided with central bores 13 extending axially inwardly from the outer ends of the indicator body terminating centrally thereof in communication with a radially directed drilled opening 14 which is centrally located within the collar 12.

The interior base of the collar 12 is provided with a series of stepped shoulders 15, 16 and 17. These shoulders increase in diameter in the order named and the shoulder 15 supports a moisture indication means forming a part of the present invention and generally designated by the numeral 18. The shoulder 16 carries an annular gasket 19 against which is clamped a disc window 20 formed of glass or any other suitable transparent material. The shoulder 17 has compressed thereagainst an annular packing 21 of suitable deformable material. The assembly is completed by the receipt of a retaining gland 22 threadedly received within the collar 12 and along the top surface thereof having a pair of oppositely positioned grooves 23 to receive a special type of tool for tightening and loosening of the gland in the assembly. The collar 12 is externally threaded to receive a cup-shaped seal cap 24 thereabout to cover and close the top of the collar 12 to prevent the collection of foreign material in the interior thereof on the top surface of the window 20 and further protect the window from inadvertent damage.
FIG. 2 illustrates the liquid indicator 10 with the seal cap 24 removed therefrom.

Referring particularly to FIGS. 3 and 4, the refrigerant moisture indication means 18 consists of a retainer provided with a moisture sensitive material carrying portion 25 which is of frame-like rectangular shape. Each corner of the portion 25 has integrally joined therewith a leg 26 which is radially directed therefrom at an angle to provide an overall table-like structure with the legs 26 being arranged for engagement with the annular shoulder 15 of the indicator 10. The legs 26 are preferably formed of resilient material to provide for tensioned mounting of the moisture indication means 18 in close association with the inner surface of the window 20. This type of mounting prevents inadvertent dislodging of the indication means during use of the indicator 10 when liquid refrigerant flows through the passageways 13 and opening 14.

For immediate discernible moisture indication, I have discovered that the combination of moisture insensitive and moisture sensitive materials arranged to provide observable word instruction based on the moisture content of the liquid refrigerant in contact therewith provides an indication system which is accurate, readily and immediately understood by even unskilled persons, suitable for "built-in" use, and inexpensive to manufacture and maintain. In this type of indication means, I make use of two different materials with one arranged as an overlay of the other. The outermost or overlay material is preferably moisture sensitive and is of a changeable color such as from blue to pink. The moisture sensitive material includes reversible salts of known type which in their reversible reactions take up or give off water in the form of moisture as the case may be. During the reversible reactions there are definite color changes which are readily observable for the purposes of the present invention. The salts are selected and incorporated in the moisture sensitive material and upon contact by liquid refrigerant, a change in color will result depending upon the amount of moisture present in the refrigerant. The bottom material is preferably moisture insensitive and is of a fixed color such as blue or pink as will be described.

With different types of refrigerant, there are different specified moisture levels which should not be exceeded in order to prevent corrosion in the refrigeration system. Consequently, the particular salts selected will be suitable for establishing a definite color break or change for a given refrigerant at a given moisture content. In illustrating the principles of the present invention, the moisture sensitive paper will preferably be blue in its dry condition whch would mean that the mosture content of the liquid refrigerant does not exceed the predetermined level. In the wet condition where the moisture content of the liquid refrigerant equals or exceeds a predetermined level, the moisture sensitive material changes its color from blue to a definite pink which is very clearly contrasted, for example, against a permanent non-changing blue of the moisture insensitive material.

In order to readily observe the contrast in colors of the different materials, the superimposed moisture sensitive material is preferably apertured in a stencil-like manner to provide a word instruction with the letters of the word being filled in by the background color of the moisture insensitive material. Under these conditions, a safe moisture content in liquid refrigerant will result in a blending of the blue of the moisture insensitive material observable through the stencil-like lettering of the superimposed moisture sensitive material and the word instruction will not be readily observable at all except possibly under very close scrutiny. With the attaining or exceeding of the predetermined moisture content, the initial blue color of the moisture sensitive paper changes to a definite pink which then highlights the word instruction which is in blue and the word instruction is immediately and very clearly observable. The operator of the refrigeration system is immediately informed of the presence of an undesirable amount of moisture in the liquid refrigerant and steps are then taken to replace the refrigerant drier units to remove this excess moisture from the refrigerant. With a drop in the moisture content below the predetermined level, the pink color of the moisture sensitive material is converted to blue and the word instruction disappears.

In utilizing the principles described above, the moisture indication means 18 in its moisture sensitive material carrying portion 25 has received therein a top layer of moisture sensitive material 27 which carries a stencil-like word instruction illustrated as the word "WET." Immediately below the material 27 is a layer of moisture insensitive material 28 which continuously covers the stencil-like word instruction in background relation and is observable therethrough. The materials 27 and 28 are generally paper-like in nature and are held in place by a screen 29. The materials described are held against the back face of the frame-like carrying portion 25 of the retainer and are clamped thereto by flange projections 30 formed integrally with the end surfaces of the carrying portion intermediate pairs of legs 26 and folded downwardly and under the retainer to clamp the end edges of the material centrally thereof.

FIGS. 5 and 6 graphically illustrate the color changes above described. FIG. 5 indicates the general disappearance and blending of the word instruction with its one-color surroundings and background, this color for purposes of description being blue. FIG. 6 illustrates the marked contrast and eye-catching appearance of the word instruction with the changing of the moisture sensitive material 27 to pink as contrasted with the permanent blue of the moisture insensitive material 28. As shown in FIG. 2, the word instruction is readily observable through the window 20 of the indicator 10.

FIGS. 7 and 8 illustrate a modified form of moisture indication means 31 particularly adapted for use with the liquid indicator 10 of FIGS. 1 and 2. The indication means 31 includes a spring metal retainer 32 which is somewhat similar to the retainer of the indication means 18 previously described. However, with respect to the main points of difference in retainer design, the retainer 32 includes a central, elongated body portion which is supported at opposite ends by leg portions 33 which as particularly shown in FIG. 7 are in the form of curved bands designed for engagement with the annular shoulder 15 of the indicator 10 as previously described. The retainer 32 is illustrated in blank form in FIG. 7 while in FIG. 8 it will be noted that the leg portions 33 are inclined downwardly by bending thereof for mounting of the retainer as described. The central portion of the retainer 32 carries thereon two sets of layers of moisture insensitive and sensitive materials with each set being provided with a different word instruction. The separate sets are designated respectively by the numerals 34 and 35.

The set 34 includes a bottom layer of moisture sensitive paper 37 having superimposed thereon a layer of moisture insensitive material 38. The moisture insensitive material carries the word instruction "DRY" for ready observance thereof when the refrigeration system is adequately dry. In other words, the arrangement of the two different materials in the set 34 is the reverse of the arrangement of materials previously described in connection with the indication means 18. Under such conditions the permanent color of the moisture insensitive material 38 is pink to provide contrasting color with the moisture sensitive material when the system is dry. The contrasting blue color of the moisture sensitive material 37 will be readily observable through the stencil of the superimposed moisture insensitive material 38.

The second set 35 as particularly shown in FIG. 8 is just the reverse from the set 34 and conforms with the arrangement previously described. The moisture sensitive material 37 is superimposed on the moisture insensitive material 38 with the moisture sensitive material 37 carrying the stenciled word instruction "WET." In this set, the moisture insensitive material 38 is a permanent blue. When the refrigeration system is dry, the colors of the materials of the set 35 will blend and the word instruction "WET" will not be observable while the word instruction "DRY" of the set 34 will be readily observable. Alternately, upon the exceeding of a predetermined moisture content in the refrigerant, the resulting color changes in the two separate sets 34 and 35 will bring about the disappearance of a word instruction "DRY" and appearance of the word instruction "WET." In utilizing separate strip materials with the retainer 35, the same may be suitably affixed thereto by rivets 36 or the like extending through opposite ends of the material.

The arrangement described in connection with the indication means 31 is preferred in that two separate, readily observed word instructions are used alternately for direct and unmistakable communication of the condition of the system to the operator. In any moisture indication arrangement of the types disclosed herein where the moisture insensitive material constitutes the "background" or bottom layer, it will be understood that paper material need not necessarily provide the fixed color. Actually, an enamel or lacquer-type coating may be permanently applied to the surface portion of the retainer with the color of the coating being adequate for use in the manner described.

FIGS. 7–11 illustrate a different form of liquid indicator 41 and a different type of retainer 42 useful in mounting the moisture indication arrangement of the present invention in the particular indicator 41. The indicator 41 includes a pair of end constructions 43 which include threaded nipple portions 44 and which at the enlarged ends thereof threadedly receive therein opposite ends of a connecting sleeve 45. The sleeve 45 is provided with a pair of oppositely positioned circular apertures 46 permitting viewing of the interior of a straight-through liquid refrigerant flow passage 47 through a sleeve or tube-like window 48 which is telescoped within the sleeve 45 and in opposite ends of the end constructions 43. The assembly described is sealed against leakage by gaskets 49 which are compressed between the ends of the connecting sleeve 45 and interior shoulder seats formed in the end constructions 43. The structural features described are known and, consequently, a detailed explanation of the same are not considered necessary.

The retainer 42 is mounted within the tube window 48 for contact with liquid refrigerant flowing therethrough. As better illustrated in FIG. 9, the retainer 42 includes a moisture sensitive material carrying portion 50 having integrally joined therewith at opposite ends thereof a pair of downwardly angled leg sections 51 which in turn are integrally joined with axially extending leg sections 52 with the free ends of the sections 52 being folded downwardly to define attaching flanges 53. The retainer 42 is preferably formed from resilient material such as spring metal and is of one-piece construction. In mounting the retainer in the tube window 48, the oppositely directed legs are spread slightly to place the flanges 53 in overlapping tight engagement with opposite end surfaces of the tube window 48 thus placing the moisture sensitive material carrying portion 50 in close association with a portion of the inner surface of the tube window 48 which is aligned with one of the openings 46 in the connecting sleeve 45.

The moisture sensitive material carrying portion 50 of the retainer 42 is provided with integrally formed pairs of clamping ears 54 which are folded upwardly and inwardly to clamp on the top surface of the portion 50 the layers of moisture insensitive and sensitive material. Referring particularly to FIGS. 9 and 10, and in line with the description set forth above, the upper layer 55 is the stencil-like, instruction carrying, moisture insensitive material superimposed over moisture sensitive material 56. The carrying portion 50 is provided with a series of apertures 57 (FIG. 10) which permit liquid refrigerant contact with the moisture sensitive material 56. The composite moisture indication means including the materials 55 and 56 functions in the same manner as described above with the moisture insensitive material 55 being of a fixed color, such as blue, and the moisture sensitive material 56 being of a changeable color such as blue to pink and pink to blue. The particular form of retainer described efficiently holds the moisture indication arrangement against displacement within the tubular liquid indicator and the word instruction is readily viewable through one of the openings 46 as shown in FIG. 7.

FIGS. 12–15 illustrate a liquid indicator 58 having mounted therein still another form of moisture indication means 59. The structural features of the indicator 58 exclusive of the moisture indication means 59 are identical with those of the indicator 41 previously described. Accordingly, like reference numerals are used to identify the same parts, the illustrations of FIGS. 12, 13 and 15 being utilized to show the mounting of the modified moisture indication means 59 in a standard form of tubular liquid indicator.

As particularly shown in FIG. 14, the moisture indication means 59 includes a retainer of cross-like shape being formed from a band-like moisture sensitive material carrying portion 60 having integrally formed therewith and extending outwardly therefrom oppositely directed leg members 61. The free ends of the leg members 61 are provided with right-angled attachment flanges 62 which engage opposite end surfaces of the tube window 48 of the indicator 58 as particularly shown in FIG. 13. The material from which the retainer is formed is preferably readily flexible to provide for bending of the portion 60 into circular shape to conform with the inner circumference of the tube window 48 in alignment with the oppositely positioned window openings 46 as particularly illustrated in FIGS. 12, 13 and 15.

The portion 60 has mounted thereon the composite moisture indication material including a bottom layer of moisture sensitive material 63 and a top layer of moisture insensitive material 64 which carries word instructions in stencil-like manner as previously described. It will be noted that the word instructions are repeated for alignment with both of the window openings 46 to thus provide ready indication from either side of the liquid indicator 58. The composite materials 63 and 64 are clamped in place on the portion 60 by a plurality of lug-like members 65 which are integrally formed along the side margins of the portion 60 and which are folded upwardly and inwardly over face portions of the top moisture insensitive material 64. To provide for ready contact of liquid refrigerant with the moisture sensitive material 63, the portion 60 is perforated as identified by the reference numerals 66.

With the retainer being formed from resilient material, the moisture sensitive material carrying portion 60 in its mounted condition is placed in tension and tightly engages the inner surface portion of the tube window 48. The particular form of indicator means 59 and the manner in which the same is mounted in the indicator 58 positions the indication means peripherally of the liquid refrigerant flow passage 47 to eliminate subjecting the retainer to displacement by the force of refrigerant flow. Furthermore, the clamping ends of the legs 61 eliminate any possibility of inadvertent displacement of the retainer from its operative position relative to the window openings 46. The contrasting color and color changes are the type previously described with the moisture insensitive material 64 being permanently blue, for example, and the moisture sensitive material 63 being changeable from blue to pink to blue.

While the moisture indication means of the present invention have been described particularly in connection with utilization of the word "WET," it will be understood that any suitable word instruction may be utilized. For example, the word "DRY" may be used with appropriate color blending and variation as described in connection with FIGS. 7 and 8. By using superimposed moisture indication material as described, the composite arrangement is adapted for mounting in protected relation within a liquid indicator and there is no need to supply with the indicator some external or separate color standard for use as a reference.

Obviously certain modifications and variations of the invention as hereinbefore set forth may be made without departing from the spirit and scope thereof, and therefore only such limitations should be imposed as are indicated in the appended claims.

I claim:

1. In a liquid indicator for use in refrigerant flow lines, said indicator including a tubular transparent window portion which is radially offset relative to an axially extending liquid refrigerant flow passage and in communication therewith, the provision of refrigerant moisture indication means in said tubular portion and comprising a retainer having a material carrying portion held in observable association with the inner surface of a removable window member mounted in said tubular portion, said retainer comprising a generally flat central portion supported by leg means formed from resilient material and engaged with an annular support surface forming a part of said tubular portion, said leg means being integrally formed with said central portion and being radially directed therefrom and in tension to hold the outer surface of said central portion in engagement with the inner surface of said window member, said central portion having mounted thereon superimposed layers of moisture sensitive material and moisture insensitive material, the outermost of said layers having formed therein in stencil-like manner a word instruction which is observable based on the moisture content of the liquid refrigerant in contact with said layer of moisture sensitive material, said layer of moisture insensitive material being of a fixed color while said layer of moisture sensitive material is of changeable color to provide for instruction appearance upon the attaining of a predetermined moisture content in said refrigerant, said central portion of said retainer being apertured for liquid refrigerant contact with said layers, said retainer being resiliently held between said window member and said annular support surface by said leg means and fully contained in said tubular portion for ready removal therefrom upon removal of said window member.

2. In a tubular liquid indicator for use in refrigerant flow lines, said indicator including a tubular transparent window portion therein through which liquid refrigerant flows, said window portion sealing off apertures in said indicator through which refrigerant flow is observable, the provision of a retainer having a central moisture indication means carrying portion maintained in observable engagement with said window portion and aligned with said apertures by oppositely directed and axially extending holding means, said holding means being in the form of a pair of oppositely directed legs which are integrally formed with said central carrying portion and are radially directed therefrom co-axially of said tubular window portion to hold said carrying portion in engagement with the inner surface of said window portion, the ends of said legs each being flanged and being in overlapping gripping relation with opposite end surfaces of said window portion for clamped mounting of said retainer in said window portion.

3. The liquid indicator of claim 2 wherein said central carrying portion is in the form of a flexible band extending at right angles to said holding means and being in circumferential engagement with the inner surface of said window portion.

4. The liquid indicator of claim 2 wherein said central carrying portion is in the form of an axially extending generally flat band with the holding means formed integrally with opposite ends thereof, each of said holding means extending radially across the interior of said window portion into engagement with an opposite surface portion thereof and extending axially along said opposite surface portion into overlapping gripping relation with an adjacent end surface thereof.

5. In a tubular liquid indicator for use in refrigerant flow lines, said indicator including a tubular transparent window portion therein through which liquid refrigerant flows, said window portion sealing off apertures in said indicator through which refrigerant flow is observable, the provision of a retainer having a central moisture indication means carrying portion maintained in observable engagement with said window portion and aligned with said apertures by oppositely directed and axially extending holding means, said holding means being in the form of a pair of oppositely directed legs which are integrally formed with said central carrying portion and are radially directed therefrom co-axially of said tubular window portion to hold said carrying portion in engagement with the inner surface of said window portion, the ends of said legs each being flanged and being in overlapping gripping relation with opposite end surfaces of said window portion for clamped mounting of said retainer in said window portion, said moisture indication means including superimposed layers of moisture sensitive material and moisture insensitive material, the outermost of said layers having formed therein in stencil-like manner a word instruction which is observable based on the moisture content of the liquid refrigerant in contact with said layer of moisture sensitive material, said layer of moisture insensitive material being of a fixed color while said layer of moisture sensitive material is of changeable color to provide for instruction appearance upon the attaining of a predetermined moisture content in said refrigerant.

6. The liquid indicator of claim 5 wherein said central carrying portion is in the form of a flexible band extending at right angles to said holding means and being in circumferential engagement with the inner surface of said window portion.

7. The liquid indicator of claim 5 wherein said central carrying portion is in the form of an axially extending generally flat band with the holding means formed integrally with opposite ends thereof, each of said holding means extending radially across the interior of said window portion into engagement with an opposite surface portion thereof and extending axially along said opposite surface portion into overlapping gripping relation with an adjacent end surface thereof.

References Cited in the file of this patent

UNITED STATES PATENTS

| | | |
|---|---|---|
| 650,149 | Howard | May 22, 1900 |
| 2,464,155 | Russell | Mar. 8, 1949 |
| 2,757,632 | Wittlin | Aug. 7, 1956 |
| 2,787,238 | Luce | Apr. 2, 1957 |
| 2,811,128 | Franck | Oct. 29, 1957 |
| 2,843,078 | Wittlin | July 15, 1958 |
| 2,844,026 | Wischmeyer | July 22, 1958 |

FOREIGN PATENTS

| | | |
|---|---|---|
| 284,120 | Great Britain | Jan. 26, 1928 |